US012746716B2

(12) United States Patent
Grumm et al.

(10) Patent No.: US 12,746,716 B2
(45) Date of Patent: Sep. 29, 2026

(54) PROCESS OF MODIFYING SURFACE OF A COMPOSITE MATERIAL BASE UNIT

(71) Applicant: BASF SE, Ludwigshafen am Rhein (DE)

(72) Inventors: Kipp Grumm, Wyandotte, MI (US); Elias Ruda Shakour, Wyandotte, MI (US); Ankur M Bhosale, Wyandotte, MI (US)

(73) Assignee: BASF SE Ludwigshafen am Rhein (DE)

( * ) Notice: Subject to any disclaimer, the term of this patent is extended or adjusted under 35 U.S.C. 154(b) by 148 days.

(21) Appl. No.: 18/563,341

(22) PCT Filed: May 24, 2022

(86) PCT No.: PCT/EP2022/064069
§ 371 (c)(1),
(2) Date: Nov. 21, 2023

(87) PCT Pub. No.: WO2022/248482
PCT Pub. Date: Dec. 1, 2022

(65) Prior Publication Data

US 2024/0217165 A1 Jul. 4, 2024

Related U.S. Application Data

(60) Provisional application No. 63/192,734, filed on May 25, 2021.

(30) Foreign Application Priority Data

Jul. 12, 2021 (EP) .................................... 21184931

(51) Int. Cl.
*B29C 59/04* (2006.01)
*B29C 70/12* (2006.01)
(Continued)

(52) U.S. Cl.
CPC ............ *B29C 59/046* (2013.01); *B29C 70/12* (2013.01); *B29C 70/528* (2013.01);
(Continued)

(58) Field of Classification Search
None
See application file for complete search history.

(56) References Cited

U.S. PATENT DOCUMENTS 4,880,584 A * 11/1989 Jones ..................... C08J 5/0405 264/331.19
5,421,931 A * 6/1995 Carmien ............. B29C 37/0082 156/169

FOREIGN PATENT DOCUMENTS

DE 42 38 696 5/1994
EP 0 531 667 3/1993
(Continued)

OTHER PUBLICATIONS

International Preliminary Report on Patentability received for PCT Application No. PCT/EP2022/064069, mailed on Dec. 7, 2023, 9 pages.
(Continued)

*Primary Examiner* — Mohammad M Ameen
(74) *Attorney, Agent, or Firm* — Baltazar Gomez

(57) ABSTRACT

A process of modifying a surface of a composite material base unit includes: providing the composite material base unit; pressing at least one impression module of a modifying unit on the surface of the composite material base unit to form at least one surface geometry on the surface; optionally heating the surface of the composite material base unit by at least one or more of heating before pressing, during pressing, after pressing, or combinations thereof; the composite material base unit contains at least one or more of a resilient material, a covering material, or a combination thereof, the at least one impression module includes at least one protru-
(Continued)

sion, and/or at least one depression resulting in the surface geometry on the surface. Also herein is a process for preparing an interlocked composite material base unit and a process of utilizing the composite material base unit in automotive and construction.

13 Claims, 6 Drawing Sheets

(51) Int. Cl.

| | |
|---|---|
| ***B29C 70/52*** | (2006.01) |
| *B29K 75/00* | (2006.01) |
| *B29K 77/00* | (2006.01) |
| *B29K 105/12* | (2006.01) |

(52) U.S. Cl.

CPC .... *B29C 2791/003* (2013.01); *B29K 2075/00* (2013.01); *B29K 2077/10* (2013.01); *B29K 2105/12* (2013.01)

(56) References Cited

FOREIGN PATENT DOCUMENTS

| | | |
|---|---|---|
| EP | 1 816 242 | 8/2007 |
| JP | H04-59649 | 2/1992 |

OTHER PUBLICATIONS

International Search Report received for PCT Application No. PCT/EP2022/064069, mailed on Sep. 9, 2022, 4 pages.

Written Opinion received for PCT Application No. PCT/EP2022/064069, mailed on Sep. 9, 2022, 7 pages.

* cited by examiner

PROCESS OF MODIFYING SURFACE OF A COMPOSITE MATERIAL BASE UNIT

CROSS-REFERENCE TO RELATED APPLICATIONS

This application is a National Stage entry under 35 U.S.C. § 371 of International Application No. PCT/EP2022/064069, filed on May 24, 2022, and which claims the benefit of priority to provisional U.S. Patent Application No. 63/192,734 filed on May 25, 2021 and European Patent Application No. 21184931.0, filed on Jul. 12, 2021. The content of each of these applications is hereby incorporated by reference in its entirety.

FIELD OF INVENTION

The present invention relates to a process of modifying a surface of a composite material base unit, process of interlocking the surface of the composite material base unit, the composite material base unit formed thereof, and use of the composite material base unit.

BACKGROUND OF THE INVENTION

Frames, sub-frames in vehicles or construction units are provided to have sufficient stiffness and have load bearing capacities. For such robust physical requirement, the components of the frames and subframes are made of metal. Although metal components, more specifically steel components do provide strength to withstand impact forces and higher loads, they are heavy, costly, require complicated manufacturing process, affect environment, and increases overall cost of the vehicles and construction units. Hence these plurality of metal components are increasingly being replaced with thermoplastic/plastic/fibre reinforced composite material base units that are light weight, come in desired shapes. These composite material base units at the same time provides for same load bearing capacity and meet the structural requirements of the vehicles and construction units. These composite material base units include compression limiters and composite bars.

Compression limiters made of composite materials replace metal screws used to fasten and secure the injection molded part to another part in an assembly. U.S. Pat. No. 10,518,819 B1 discloses composite compression limiter. Composite compression limiters are made of polymeric material and fibre reinforcement including glass and carbon fibres. Generally, composite compression limiters and injection molded materials are of dissimilar materials; thereby not bonding chemically with each other resulting in reduced pull out force of the compression limiter. Fastening of assembled parts is further loosened by environmental extremes, vibration, and impact forces.

It was, therefore, an object of the present invention to provide for a process resulting in improved composite material base units including compression limiters and composite bars such that the composite material base unit is associated with improved pull out strength, reliability, improved torsional resistance, improved thermal stability and improved resistance to creep.

SUMMARY OF THE INVENTION

Surprisingly, it has been found that the above identified object is met by providing a process for modifying a surface of the composite material base unit, a process of interlocking the surface of the composite material base unit, and the composite material base unit formed thereof.

Accordingly, in one aspect, the presently claimed invention is directed to a process of modifying a surface (202) of a composite material base unit (201), the process comprising:

a. providing the composite material base unit (201);
b. impressing at least one impression module (103) of a modifying unit (100) on the surface (202) of the composite material base unit (201) to form at least one surface geometry (203) on the surface (202);
c. optionally heating the composite material base unit (201) to cure the surface (202) by a heating means before pressing, during pressing, after pressing, or combinations thereof;

wherein the composite material base unit comprises a resilient material, a covering material, or a combination thereof. wherein the impression module (103) includes at least one protrusion, and/or at least one depression resulting in said surface geometry (203) on said surface (202).

In another aspect, the presently claimed invention is directed to a process for interlocking the surface (202) of composite material base unit (201), the process comprising:

a. modifying the surface (202) of the composite material base unit (201) by the process as mentioned hereinabove forming at least one surface geometry (203) on the surface (202);
b. overmolding the surface (202) with at least one surface geometry (203) of the composite material base unit (201) with an injection molded material and
c. optionally curing the injection molded material to form the interlocked based unit (401);

wherein the surface geometry (203) of the composite material base unit (201) mechanically interlocks the composite material base unit (201) with the injection molded material.

In another aspect, the presently claimed invention is directed to the composite material base unit obtained by the aforementioned processes.

In another aspect, the presently claimed invention is directed to the use of the composite material base unit.

DETAILED OF THE DRAWINGS

DETAILED DESCRIPTION OF THE INVENTION

Figure 1:
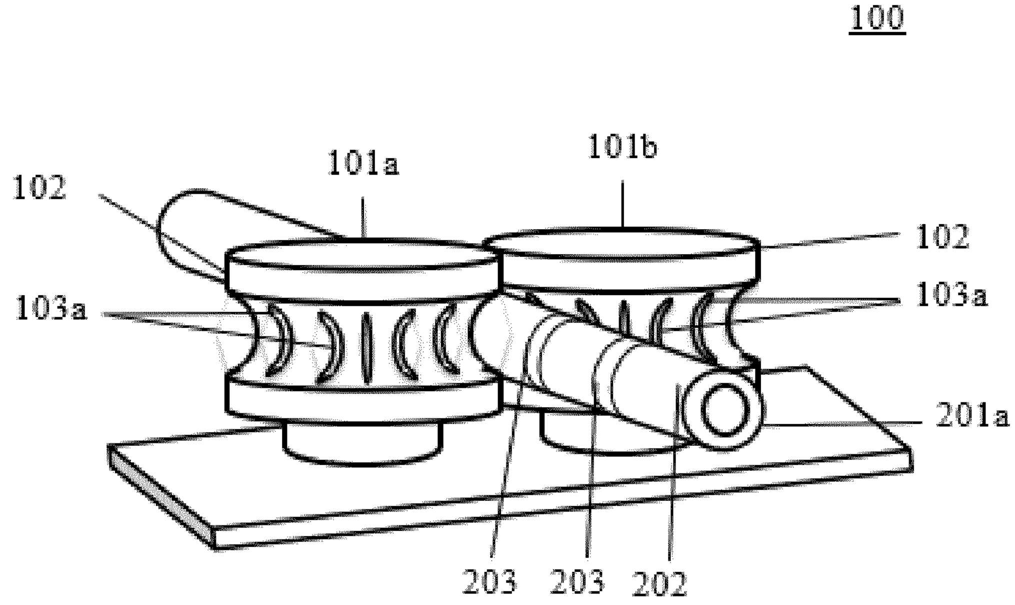
FIG. 1 illustrates an embodiment with the modifying unit (100) comprising a pair of wheels (101*a*, 101*b*).

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the present invention will be limited only by the appended claims.

The terms "comprising", "comprises" and "comprised of" as used herein are synonymous with "including", "includes" or "containing", "contains", and are inclusive or open ended and do not exclude additional, non-recited members, elements or method steps. It will be appreciated that the terms "comprising", "comprises" and "comprised of" as used herein comprise the terms "consisting of", "consists" and "consists of".

Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the invention, and form different embodiments, as would be understood by those in the art. For example, in the appended claims, any of the claimed embodiments can be used in any combination.

Furthermore, the ranges defined throughout the specification include the end values as well, i.e. a range of 1 to 10 implies that both 1 and 10 are included in the range. For the avoidance of doubt, the applicant shall be entitled to any equivalents according to applicable law.

An aspect of the present invention is embodiment 1, directed towards a process of modifying a surface (202) of a composite material base unit (201), the process comprising:

a. providing the composite material base unit (201);
b. impressing at least one impression module (103) of a modifying unit (100) on the surface (202) of the composite material base unit (201) to form at least one surface geometry (203) on the surface (202);
c. optionally heating the composite material base unit (201) to cure the surface (202) by a heating means before pressing, during pressing, after pressing, or combinations thereof;

wherein the composite material base unit comprises a resilient material, a covering material, or a combination thereof. wherein the impression module (103) includes at least one protrusion, and/or at least one depression resulting in said surface geometry (203) on said surface (202).

Composite Material Base Unit

In an embodiment, the composite material base unit (201) is defined as a material in solid form. In an embodiment the composite material base unit (201) is in shape of flat sheet, sphere, cuboidal, pipe. In another embodiment, the composite material base unit (201) is defined by a surface (202). The surface (202) completely or partially encloses a void or hollow space. In an embodiment the void or hollow space is uniformly filled with the same material defining the surface (202) of the composite material base unit (201).

In a preferred embodiment, the composite material base unit (201) is a compression limiter or a composite rebar, where the composite material base unit (201) comprises a thermoplastic composite, a polyamide, a co-polyamide, an aromatic polyamides, a thermoplastic polyurethane (TPU), or any combination thereof.

In a preferred embodiment, the composite material base unit (201) is in the shape of a compression limiter. The compression limiter is of plain sleeve-type. The compression limiter (201) is illustrated in the FIGS. 1, 2, 3 and 4. The compression limiter is a pipe shaped unit with an outer wall and an inner wall. The region between the outer wall and the inner wall define an annular space. The inner wall defines a hollow region. The outer wall is defined as the surface (202). The surface (202) is pressed by the impression module (103) of the modifying unit (100) to form at least one surface geometry (203) on the surface.

In an embodiment, the at least one surface geometry (203) is defined as surface modification such as a groove, a single groove, a double groove, a thread, a shallow thread, a deep thread, a knurl, a non-knurled design, a rib, a knob, and the like.

In another preferred embodiment, the composite material base unit is in shape of a reinforcement bar (501). The reinforcement bar includes a surface (502) and is uniform pipe shaped unit with no axial hollow region.

In another preferred embodiment, the composite material base unit (201) is a cube shaped unit.

In an embodiment, the composite material base unit (201) is made of a composite structure. The composite structure includes a thermoset composite. The term "composite" as used hereinabove and hereinafter, refers to at least one thermoplastic composite material. Although, other materials can also be used for this purpose, thermoplastic composite materials have been chosen for the present invention due to their enhanced performance characteristic over a wide range of temperature and pressure conditions.

In an embodiment, the composite material base unit (201) includes the resilient material, without the covering material, or a resilient material partially covered with the covering material or a resilient material completely covered by the covering material, or only the covering material.

In a preferred embodiment, the composite material base unit (201) includes the resilient material, without the covering material.

In yet another preferred embodiment, the composite material base unit (201) includes the resilient material, with the covering material.

In yet another preferred embodiment, the composite material base unit (201) includes the resilient material partially covered with the covering material.

In yet another preferred embodiment, the composite material base unit (201) includes the resilient material completely covered by the covering material.

In yet another preferred embodiment, the composite material base unit (201) includes only the covering material.

In an embodiment, the composite material base unit (201) is a composite structure with at least one layer of resilient material and/or a covering material.

In a preferred embodiment, the composite material base unit (201) is a composite structure with composition of the resilient material different from composition of the covering material.

In another preferred embodiment the composite material base unit (201) is the composite structure including only the resilient material.

In a more preferred embodiment, the composite material base unit is a composite reinforcement bar (501) made of only the resilient material.

Resilient Material

The resilient material comprises fibres, glass material, wood, and hard surface sheet.

The fibres include non-woven fibers or fabric, woven fabrics, or non-crimp fabrics. The fibers include natural, synthetic or glass fibers. Synthetic fibers are for instance carbon fibers or polyester fibers. Natural fibers are for instance cellulosic bast fibers. The non-woven fibers may also contain a small amount of synthetic thermoplastic fiber, for instance polyethylene terephthalate fibers (PET). The fibers can be synthetic polyester fibers or other fibers or similar characteristics. Glass fibres include chopped glass fibres.

Although, any suitable binding agent can be used for binding the chopped glass fibers, preferred is an acrylic binder. The acrylic binder is a cured aqueous based acrylic resin. The binder cures, for instance, through carboxylic groups and a multi-functional alcohol.

In an embodiment, the fibres are bound by a binding agent. The binding agent includes acrylic binders. In embodiment, the resilient material is a layer formed of by sandwiching at least two sheets of hard material. Acrylic binders are polymers or copolymers containing units of acrylic acid, methacrylic acid, their esters, or related derivatives. The acrylic binders are for instance formed by aqueous emulsion polymerization employing (meth)acrylic acid (where the convention (meth)acrylic is intended to embrace both acrylic and methacrylic). 2-hydroxyethyl(meth)acrylate, 2-hydroxypropyl(meth)acrylate, 2-hydroxybutyl(meth) acrylate, methyl(meth)acrylate, ethyl(meth)acrylate, propyl (meth)acrylate, isopropyl(meth)acrylate, butyl(meth) acrylate, amyl(meth)acrylate, isobutyl(meth)acrylate, t-butyl(meth)acrylate, pentyl(meth)acrylate, isoamyl(meth) acrylate, hexyl(meth)acrylate, heptyl(meth)acrylate, octyl (meth)acrylate, isooctyl(meth)acrylate, 2-ethylhexyl(meth) acrylate, nonyl(meth)acrylate, decyl(meth)acrylate, isodecyl (meth)acrylate, undecyl(meth)acrylate, dodecyl(meth) acrylate, lauryl(meth)acrylate, octadecyl(meth)acrylate, stearyl(meth)acrylate, tetrahydrofurfuryl(meth)acrylate, butoxyethyl(meth)acrylate, ethoxydiethylene glycol (meth) acrylate, benzyl(meth)acrylate, cyclohexyl(meth)acrylate, phenoxyethyl(meth)acrylate, polyethylene glycol mono (meth)acrylate, polypropylene glycol mono(meth)acrylate, methoxyethylene glycol (meth)acrylate, ethoxyethoxyethyl (meth)acrylate, methoxypolyethylene glycol (meth)acrylate, methoxypolypropylene glycol (meth)acrylate, dicyclopentadiene(meth)acrylate, dicyclopentanyl(meth)acrylate, tricyclodecanyl(meth)acrylate, isobornyl(meth)acrylate, bornyl (meth)acrylate or mixtures thereof.

Other monomers which can be co-polymerized with the (meth)acrylic monomers, generally in a minor amount, include styrene, diacetone(meth)acrylamide, isobutoxymethyl(meth)acrylamide. N-vinylpyrrolidone. N-vinylcaprolactam, N,N-dimethyl(meth)acrylamide, t-octyl(meth)acrylamide. N,N-diethyl(meth)acrylamide, N,N'-dimethylaminopropyl(meth)acrylamide. (meth)acryloylmorphorine; vinyl ethers such as hydroxybutyl vinyl ether, lauryl vinyl ether, cetyl vinyl ether, and 2-ethylhexyl vinyl ether; maleic acid esters; fumaric acid esters and similar compounds.

Multi-functional alcohols are for instance hydroquinone, 4,4'-dihydroxydiphenyl. 2,2-bis(4-hydroxyphenyl)propane, cresols or alkylene polyols containing 2 to 12 carbon atoms, including ethylene glycol, 1,2- or 1,3-propanediol, 1,2-, 1,3- or 1,4-butanediol, pentanediol, hexanediol, octanediol, dodecanediol, diethylene glycol, triethylene glycol, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol, tripentaerythritol and sorbitol.

Covering Material

In a preferred embodiment, the covering material completely or partially envelops the at least one layer of resilient material.

In another preferred embodiment, the composite material base unit (201) is the composite structure including only the covering material directly injection molded in a mold without any layer of the resilient material.

In a more preferred embodiment, the composite material base unit (201) is the composite structure including the covering material directly injection molded in a compression limiter (201) shaped mold without any layer of the resilient material.

In an alternate preferred embodiment, the composite material base unit (201) is the composite structure including the covering material directly injection molded in a mold with at least one layer of the resilient material. In another alternate preferred embodiment, the covering material partially encloses the resilient material. In another alternate preferred embodiment, the covering material completely encloses the resilient material.

In an embodiment, the cover material includes polyurethane. The cover material is generally made of polyurethane film formed by spraying onto the resilient material or pouring and curing the polyurethane material in a mold.

The polyurethane is produced from a reaction mixture comprising an isocyanate and an isocyanate reactive compound. The reaction mixture further comprises a chain extender, a cross linker, a catalyst, additives, and fillers.

The isocyanates can be selected from aliphatic isocyanates, aromatic isocyanates, and a combination thereof. By the term "aromatic isocyanate", it is referred to molecules having two or more isocyanate groups attached directly and/or indirectly to the aromatic ring. Further, it is to be understood that the isocyanate includes both monomeric and polymeric forms of the aliphatic and aromatic isocyanate. By the term "polymeric", it is referred to the polymeric grade of the aliphatic and/or aromatic isocyanate comprising, independently of each other, different oligomers, and homologues.

In another embodiment, the isocyanate comprises an aromatic isocyanate selected from toluene diisocyanate; polymeric toluene diisocyanate, methylene diphenyl diisocyanate; polymeric methylene diphenyl diisocyanate; m-phenylene diisocyanate; 1,5-naphthalene diisocyanate; 4-chloro-1; 3-phenylene diisocyanate; 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate, tolidine diisocyanate, 1,3,5-triisopropyl benzene-2,4,6-triisocyanate and mixtures thereof. In other embodiment, the aromatic isocyanate is selected from toluene diisocyanate; polymeric toluene diisocyanate, methylene diphenyl diisocyanate; polymeric methylene diphenyl diisocyanate, m-phenylene diisocyanate; 1,5-naphthalene diisocyanate; 4-chloro-1; 3-phenylene diisocyanate; 2,4,6-toluylene triisocyanate, 1,3-diisopropylphenylene-2,4-diisocyanate and 1-methyl-3,5-diethylphenylene-2,4-diisocyanate. In other embodiments, the aromatic isocyanate is selected from toluene diisocyanate; polymeric toluene diisocyanate, methylene diphenyl diisocyanate; polymeric methylene diphenyl diisocyanate, m-phenylene diisocyanate and 1,5-naphthalene diisocyanate or a combination thereof. In still other embodiment, the aromatic isocyanate is selected from toluene diisocyanate; polymeric toluene diisocyanate, methylene diphenyl diisocyanate and polymeric methylene diphenyl diisocyanate or mixture thereof.

In another preferred embodiment, the aromatic isocyanate selected from methylene diphenyl diisocyanate, polymeric methylene diphenyl diisocyanate or combination thereof.

In another preferred embodiment, the methylene diphenyl diisocyanate is available in three different isomeric forms, namely 2,2'-methylene diphenyl diisocyanate (2,2'-MDI). 2,4'-methylene diphenyl diisocyanate (2,4'-MDI) and 4,4'-methylene diphenyl diisocyanate (4,4'-MDI). Methylene diphenyl diisocyanate can be classified into monomeric methylene diphenyl diisocyanate and polymeric methylene di-phenyl diisocyanate referred to as technical methylene diphenyl diisocyanate. Polymeric methylene diphenyl diisocyanate includes oligomeric species and methylene diphenyl diisocyanate isomers. Thus, polymeric methylene diphenyl diisocyanate may contain a single methylene diphenyl diisocyanate isomer or isomer mixtures of two or three methylene diphenyl diisocyanate isomers, the balance being oligomeric species. Polymeric methylene diphenyl diisocyanate tends to have isocyanate functionalities of higher than 2. The isomeric ratio as well as the amount of oligomeric species can vary in wide ranges in these products. For instance, polymeric methylene diphenyl diisocyanate may typically contain 30 wt.-% to 80 wt.-% of methylene diphenyl diisocyanate isomers, the balance being said oligomeric species. The methylene diphenyl diisocyanate isomers are often a mixture of 4,4'-methylene diphenyl diisocyanate, 2,4'-methylene diphenyl diisocyanate and very low levels of 2,2'-methylene di-phenyl diisocyanate.

In another preferred embodiment, the isocyanate comprises a polymeric methylene diphenyl diisocyanate. Commercially available isocyanates available under the tradename, such as, but not limited to, Lupranat® from BASF can also be used for the purpose of the present invention.

In another preferred embodiment, the aliphatic isocyanate is selected from isophorone diisocyanate, propylene-1,2-diisocyanate, propylene-1,3-diisocyanate, butylene-1,2-diisocyanate, butylene-1,3-diisocyanate, hexamethylene-1,6-diisocyanate, 2-methylpentamethylene-1,5-diisocyanate, 2-ethylbutylene-1,4-diisocyanate, 1,5-pentamethylene diisocyanate, ethyl ester l-lysine triisocyanate, 1,6,11-triisocyanatoundecane, (2,4,6-trioxotriazine-1,3,5(2h,4h,6h)-triyl)tris(hexamethylene) isocyanate, methyl-2,6-diisocyanate caproate, octamethlyene-1,8-diisocyanate, 2,4,4-trimethylhexamethylene-1,6-diisocyanate, nonamethylene diisocyanate, 2,2,4-trimethylhexamethylene-1,6-diisocyanate, decamethylene-1,10-diisocyanate, 2,11-diisocyanato-dodecane, triphe-nylmethane-4,4',4"-triisocyanate, toluene-2,4,6-triyl triisocyanate, tris(isocyanatohexyl)biuret, trimethyl-cyclohexyl] triisocyanate, 2,4,4'-triisocyanato-dicyclohexylmethane, 2,2,-methylene-bis (cyclohexyl isocyanate), 3,3'-methylene-bis(cyclohexyl isocyanate), 4,4'-methylene-bis(cyclohexyl isocyanate), 4,4'-ethylene-bis(cyclohexyl isocyanate), 4,4'-propylene-bis-(cyclohexyl isocyanate), bis(paraisocyano-cyclohexyl) sulfide, bis(para-isocyanato-cyclohexyl)sulfone, bis(para-isocyano-cyclohexyl)ether, bis(para-isocyanato-cyclohexyl) diethyl silane, bis(para-isocyanato-cyclohexyl)diphenyl silane, bis(para-isocyanato-cyclohexyl)ethyl phosphine oxide, bis(para-isocyanato-cyclohexyl)phenyl phosphine oxide, bis(para-isocyanato-cyclohexyl)N-phenyl amine, bis (para-isocyanato-cyclohexyl)N-methyl amine, 3,3-diisocyanato adamantane, 3,3-diisocyano biadamantane, 3,3-diisocyanatoethyl-1'-biadamantane, 1,2-bis (3-isocyanato-propoxy)ethane, 2,2-dimethyl propylene diisocyanate, 3-methoxy hexamethylene-1,6-diisocyanate, 2,5-dimethyl heptamethylene diisocyanate, 5-methyl nonamethylene-1,9-diisocyanate, 1,4-diisocyanato cyclo-hexane, 1,2-diisocyanato octadecane, 2,5-diisocyanato-1,3,4-oxadiazole. OCN (CH2)3O(CH2)2O(CH2)3NCO and OCN(CH2)3N(CH3) $(CH_2)_3NCO$ or polymeric forms of diisocyanates; more preferably the aliphatic isocyanate selected from isophorone diisocyanate, propylene-1,2-diisocyanate, propylene-1,3-diisocyanate, butylene-1,2-diisocyanate, butylene-1,3-diisocyanate, hexamethylene-1,6-diisocyanate, 2-methylpentamethylene-1,5-diisocyanate1,5-pentamethylene diisocyanate, 1,6,11-triisocyanatoundecane, methyl-2,6-diisocyanate caproate, octamethlyene-1,8-diisocyanate. 2,4,4-trimethylhexamethylene-1,6-diisocyanate, nonamethylene diisocyanate, 2,2,4-trimethylhexamethylene-1,6-diisocyanate, decamethylene-1,10-diisocyanate, 2,11-diisocyanato-dodecane or polymeric forms of diisocyanates; and most preferably the aliphatic isocyanate selected from isophorone diisocyanate, hexamethylene-1,6-diisocyanate, 2-methylpentamethylene-1,5-diisocyanate, 1,5-pentamethylene diisocyanate, 1 octamethlyene-1,8-diisocyanate, 2,4,4-trimethylhexamethylene-1,6-diisocyanate, nonamethylene-diisocyanate, 2,2,4-trimethylhexamethylene-1,6-diisocyanate, decamethylene-1,10-diisocyanate, 2,11-diisocyanato-dodecane and polymeric forms of diisocyanates or mixtures thereof.

In another preferred embodiment, the isocyanate reactive component is a polyol having an average functionality in the range of 2.0 to 8.0 and the hydroxyl number in the range of 15 mg KOH/g to 1800 mg KOH/g. The compounds that are reactive towards isocyanate can be present in an amount in the range of 1 wt.-% to 99 wt.-%, based on the total weight of the reaction mixture.

The polyols include polyether polyols, polyester polyols, polyetherester polyols, and a combination thereof.

In another embodiment, the polyether polyols are obtainable by known methods, for example by anionic polymerization with alkali metal hydroxides, e.g., sodium hydroxide or potassium hydroxide, or alkali metal alkoxides, e.g., sodium methoxide, sodium ethoxide, potassium ethoxide or potassium isopropoxide, as catalysts and by adding at least one amine-containing starter molecule, or by cationic polymerization with Lewis acids, such as antimony pentachloride, boron fluoride etherate and so on, or fuller's earth, as catalysts from one or more alkylene oxides having 2 to 4 carbon atoms in the alkylene moiety.

Starter molecules are generally selected such that their average functionality is preferably in the range of 2.0 to 8.0, and more preferably in the range of 3.0 to 8.0. Optionally, a mixture of suitable starter molecules is used.

Starter molecules for polyether polyols include amine containing and hydroxyl-containing starter molecules. Suitable amine containing starter molecules include, for example, aliphatic and aromatic diamines such as ethylenediamine, propylenediamine, butylenediamine, hexamethylenediamine, phenylenediamines, toluenediamine, diaminodiphenylmethane and isomers thereof.

Other suitable starter molecules further include alkanolamines, e.g. ethanolamine, N-methylethanolamine and N-ethylethanolamine, dialkanolamines, e.g., diethanolamine, N-methyldiethanolamine and N-ethyldiethanolamine, and trialkanolamines, e.g., triethanolamine, and ammonia.

Suitable amine containing starter molecules are selected from ethylenediamine, phenylenediamines, toluenediamine or isomers thereof. In one embodiment, it is ethylenediamine.

Hydroxyl-containing starter molecules are selected from sugars, sugar alcohols, for e.g. glucose, mannitol, sucrose, pentaerythritol, sorbitol; polyhydric phenols, resols, e.g., oligomeric condensation products formed from phenol and formaldehyde, trimethylolpropane, glycerol, glycols such as ethylene glycol, propylene glycol and their condensation products such as polyethylene glycols and polypropylene glycols, e.g., diethylene glycol, triethylene glycol, dipropylene glycol, and water or a combination thereof.

Suitable hydroxyl containing starter molecules are selected from sugar and sugar alcohols such as sucrose, sorbitol, glycerol, pentaerythritol, trimethylolpropane or mixtures thereof. In some embodiments the hydroxyl containing starter molecules are selected from sucrose, glycerol, pentaerythritol or trimethylolpropane.

Suitable alkylene oxides having 2 to 4 carbon atoms are, for example, ethylene oxide, propylene oxide, tetrahydrofuran, 1,2-butylene oxide, 2,3-butylene oxide, and styrene oxide. Alkylene oxides can be used singly, alternatingly in succession or as mixtures. In one embodiment, the alkylene oxides are propylene oxide and/or ethylene oxide. In some embodiments, the alkylene oxides are mixtures of ethylene oxide and propylene oxide that comprise more than 50 wt.-% of propylene oxide.

In another preferred embodiment, the amount of the polyether polyols is in the range of 1 wt.-% to 99 wt.-%, based on the total weight of the polyurethane resin composition, more preferably in the range of 20 wt.-% to 99 wt.-%, and most preferably the range of 40 wt.-% to 99 wt.-%.

In another preferred embodiment, the suitable polyester polyols have an average functionality in the range of 2.0 to 6.0, more preferably in the range of 2.0 to 5.0, and most preferably in the range of 2.0 to 4.0 and a hydroxyl number in the range of 30 mg KOH/g to 250 mg KOH/g, and most preferably in the range of 100 mg KOH/g to 200 mg KOH/g.

In another preferred embodiment, the polyester polyols are based on the reaction product of carboxylic acids or anhydrides with hydroxy group containing compounds. Suitable carboxylic acids or anhydrides have preferably from 2 to 20 carbon atoms, or from 4 to 18 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, oleic acid, phthalic anhydride. Particularly comprising of phthalic acid, isophthalic acid, terephthalic acid, oleic acid and phthalic anhydride or a combination thereof.

Suitable hydroxyl containing compounds are selected from ethanol, ethylene glycol, propylene-1,2-glycol, propylene-1,3-glycol, butyl-ene-1,4-glycol, bu-tylene-2,3-glycol, hexane-1,6-diol, octane-1,8-diol, neopentyl glycol, cyclohexane dimethanol (1,4-bis-hydroxy-methylcyclohexane), 2-methyl-propane-1,3-diol, glycerol, trimethylolpropane, hexane-1,2,6-triol, butane-1,2,4-triol, trimethylolethane, pentaerythritol, quinitol, mannitol, sorbitol, methyl glycoside, diethylene glycol, triethylene glycol, tetraethylene glycol, polyethylene glycol, dipropylene glycol, polypropylene glycol, polyethylenepropylene glycol, dibutylene glycol or polybutylene glycol. In one embodiment, the hydroxyl containing compound is selected from ethylene glycol, propylene-1,2-glycol, propylene-1,3-glycol, butylene-1,4-glycol, butylene-2,3-glycol, hexane-1,6-diol, octane-1,8-diol, neopentyl glycol, cyclohexane dimethanol (1,4-bis-hydroxy-methylcyclohexane), 2-methyl-propane-1,3-diol, glycerol, trimethylolpropane, hexane-1,2,6-triol, butane-1,2,4-triol, trimethylolethane, pentaerythritol, quinitol, mannitol, sorbitol, methyl glycoside or diethylene glycol. In another embodiment, the hydroxyl containing compound is selected from ethylene glycol, propylene-1,2-glycol, pro-pylene-1,3-glycol, butyl-ene-1,4-glycol, butylene-2,3-glycol, hexane-1,6-diol, octane-1,8-diol, neopentyl glycol or diethylene glycol. In still another embodiment, the hydroxyl containing compound is selected from hexane-1,6-diol, neopentyl glycol and diethylene glycol.

Suitable polyetherester polyols have a hydroxyl number in the range of 100 mg KOH/g to 460 mg KOH/g, more preferably in the range of 150 mg KOH/g to 450 mg KOH/g, most preferably in the range of 250 mg KOH/g to 430 mg KOH/g and in any of these embodiments may have an average functionality in the range of 2.3 to 5.0, and most preferably in the range of 3.5 to 4.7.

Such polyetherester polyols are obtainable as a reaction product of i) at least one hydroxyl-containing starter molecule; ii) of one or more fatty acids, fatty acid monoesters or mixtures thereof; iii) of one or more alkylene oxides having 2 to 4 carbon atoms.

The starter molecules of component i) are generally selected such that the average functionality of component i) is preferably 3.8 to 4.8, or from 4.0 to 4.7, or even from 4.2 to 4.6. Optionally, a mixture of suitable starter molecules is used.

Suitable hydroxyl containing starter molecules of component i) are selected from sugars, sugar alcohols (glucose, mannitol, sucrose, pentaerythritol, sorbitol), polyhydric phenols, resols, e.g., oligomeric condensation products formed from phenol and formaldehyde, trimethylolpropane, glycerol, glycols such as ethylene glycol, propylene glycol and their condensation products such as polyethylene glycols and polypropylene glycols, e.g., diethylene glycol, triethylene glycol, dipropylene glycol, and water or a combination thereof.

In another preferred embodiment, the hydroxyl containing starter molecules of component i) are selected from sugars and sugar alcohols such as sucrose and sorbitol, glycerol, and mixtures of said sugars and/or sugar alcohols with glycerol, water and/or glycols such as, for example, diethylene glycol, dipropylene glycol or combination thereof.

Said fatty acid or fatty acid monoester ii) is selected from polyhydroxy fatty acids, ricinoleic acid, hydroxyl-modified oils, hydroxyl-modified fatty acids and fatty acid esters based in myristoleic acid, palmitoleic acid, oleic acid, stearic acid, palmitic acid, vaccenic acid, petroselic acid, gadoleic acid, erucic acid, nervonic acid, linoleic acid, a- and g-linolenic acid, stearidonic acid, arachidonic acid, timnodonic acid, clupanodonic acid and cervonic acid or a combination thereof. Fatty acids can be used as purely fatty acids. In this regard, preference is given to using fatty acid methyl esters such as, for example, biodiesel or methyl oleate.

Biodiesel is to be understood as meaning fatty acid methyl esters within the meaning of the EN 14214 standard from 2010. Principal constituents of biodiesel, which is generally produced from rapeseed oil, soybean oil or palm oil, are methyl esters of saturated C16 to C18 fatty acids and methyl esters of mono- or pol-yunsaturated C18 fatty acids such as oleic acid, linoleic acid and linolenic acid.

Suitable alkylene oxides iii) having 2 to 4 carbon atoms are, for example, ethylene oxide, propylene oxide, tetrahydrofuran, 1,2-butylene oxide, 2,3-butylene oxide and/or styrene oxide. Alkylene oxides can be used singly, alternatingly in succession or as mixtures.

In another preferred embodiment, the alkylene oxides comprise propylene oxide and ethylene oxide. In another preferred embodiment, the alkylene oxide is a mixture of ethylene oxide and propylene oxide comprising more than 50 wt.-% of propylene oxide. In another embodiment, the alkylene oxide comprises purely propylene oxide.

In one embodiment, suitable chain extenders and/or cross linkers can also be present in the polyurethane resin composition, as described hereinabove. The addition of bifunctional chain extenders, trifunctional and higher-functional cross linkers or, if appropriate, mixtures thereof might be added. Chain extenders and/or cross linkers used are preferably alkanol amines and in particular diols and/or triols having molecular weights preferably in between 60 g/mol to 300 g/mol. Suitable amounts of these chain extenders and/or cross linkers can be added and are known to the person skilled in the art. For instance, chain extenders and/or cross linkers can be present in an amount up to 99 wt.-%, or up to 20 wt.-%, based on the total weight of the polyurethane resin composition.

In another embodiment, commercially available compounds that are reactive towards isocyanate can also be employed, for e.g. Sovermol®, Pluracol® and Quadrol® from BASF.

In another preferred embodiment, the isocyanate reactive component is a polyether polyol.

In another preferred embodiment, the polyurethane resin composition comprises a chain extender and/or cross linker having a molecular weight in the range of 49 g/mol to 399 g/mol.

Suitable catalysts are well known to the person skilled in the art. For instance, tertiary amine and phosphine compounds, metal catalysts such as chelates of various metals, acidic metal salts of strong acids; strong bases, alcoholates and phenolates of various metals, salts of organic acids with a variety of metals, organometallic derivatives of tetravalent tin, trivalent and pentavalent As, Sb and Bi and metal carbonyls of iron and cobalt and mixtures thereof can be used as catalysts.

Suitable tertiary amines include, such as triethylamine, tributylamine, N-methylmorpholine, N-ethylmorpholine, N,N, N',N'-tetramethylethylenediamine, pentamethyl-diethylenetriamine and higher homologues (as described in, for example, DE-A 2,624,527 and 2,624,528), 1,4-diazabicyclo (2.2.2)octane, N-methyl-N'-dimethyl-aminoethylpiperazine, bis-(dimethylaminoalkyl)piperazines, tris(dimethylaminopropyl)hexahydro-1,3,5-triazin, N,N-dimethylbenzylamine, N,N-dimethylcyclohexylamine, N,N-diethyl-benzylamine, bis-(N,N-diethylaminoethyl) adipate, N,N,N',N'-tetramethyl-1,3-butanediamine, N,N-dimethyl-p-phenylethylamine, 1,2-dimethylimidazole, 2-methylimidazole, monocyclic and bicyclic amines together with bis-(dialkylamino)alkyl ethers, such as 2,2-bis-(dimethylaminoethyl)ether. Triazine compounds, such as, but not limited to, tris(dimethylaminopropyl)hexahydro-1,3,5-triazin can also be used.

Suitable metal catalysts include metal salts and organometallics comprising tin-, titanium-, zirconium-, hafnium, bismuth-, zinc-, aluminium- and iron compounds, such as tin organic compounds, preferably tin alkyls, such as dimethyltin or diethyltin, or tin organic compounds based on aliphatic carboxylic acids, preferably tin diacetate, tin dilaurate, dibutyl tin diacetate, dibutyl tin dilaurate, bismuth compounds, such as bismuth alkyls or related compounds, or iron compounds, preferably iron-(II)-acetylacetonate or metal salts of carboxylic acids, such as tin-II-isooctoate, tin dioctoate, titanium acid esters or bismuth-(III)-neodecanoate or a combination thereof.

The catalysts, as described hereinabove, can be present in amounts preferably up to 20 wt.-% based on the total weight of the polyurethane resin composition.

In an embodiment, the process for preparing polyurethane comprises additives. The additives can be selected from pigments, dyes, surfactants, flame retardants, hindered amine light stabilizers, ultraviolet light absorbers, stabilizers, defoamers, internal release agents, desiccants, blowing agents, curing agents and antistatic agents or a combination thereof. Further details regarding additives can be found, for example, in the Kunststoffhandbuch, Volume 7. "Polyurethane" Carl-Hanser-Verlag Munich, 1st edition, 1966 2nd edition, 1983 and 3rd edition, 1993. Suitable amounts of these additives are well known to the person skilled in the art. However, for instance, the additives can be present in amounts up to 20 wt.-% based on the total weight of the polyurethane resin composition. In a preferred embodiment the composite structure is produced by resin transfer molding (RTM) technique.

In another preferred embodiment, the reaction mixture, as described hereinabove, can also comprise a reinforcing agent. Suitable reinforcing agents refer to fillers in the present context.

Suitable fillers include, such as, but not limited to, silicatic minerals, examples being finely ground quartzes, phyllosilicates, such as antigorite, serpentine, hornblendes, amphibols, chrysotile, and talc; metal oxides, such as kaolin, aluminum oxides, aluminium hydroxides, magnesium hydroxides, hydromagnesite, titanium oxides and iron oxides, metal salts such as chalk, heavy spar and inorganic pigments, such as cadmium sulfide, zinc sulfide, and also glass and others. Preference is given to using kaolin (china clay), finely ground quartzes, aluminum silicate, and coprecipitates of barium sulfate and aluminum silicate.

Suitable fillers have an average particle diameter in the range of 0.1 μm to 500 μm, more preferably in the range of 1 μm to 100 μm, and most preferably in the range of 1 μm to 10 μm. Diameter in this context, in the case of non-spherical particles, refers to their extent along the shortest axis in space.

Suitable amounts of the fillers can be present in the polyurethane resin composition which are known to the person skilled in the art. For instance, fillers can be present in an amount up to 50 wt.-%, based on the total weight of the polyurethane resin composition.

The composite material base unit is used in an automotive part in vehicle or in construction. The composite material base unit (201) is used as a composite compression limiter or a composite rebar.

Modifying Unit

The modifying unit (100) includes at least one impression module (103).

The modifying unit (100) is configured to press the at least one impression module (103) on the surface (202) of the composite material base unit (201) to form at least one surface geometry (203) on the surface (202).

In an embodiment, the at least one impression module (103) is configured to have a physical shape complementary to the at least one surface geometry (203). The at least one impression module (103) includes at least one protrusion, and/or at least one depression.

In an embodiment the pressure exerted by the at least impression module (103) of the modifying unit (101) on surface (202) of the compression material base unit (201) is in range of 0.1 Pa to 100 G Pa, in a preferred embodiment, the pressure exerted is in range of 1 Pa to 10 G Pa, or in range of 5 Pa to 10 G Pa. The impression module (103) is configured to exert high pressure or low pressure on the surface (202) of the compression material base unit (201).

In an embodiment, the surface (202) of the composite material base unit (201) is impressed by the at least one impression module (103) of the modifying unit (100) for a period of 1 second to 200 mins.

In an embodiment, the heating means provides a temperature of 30° ° C., to 600° C. In a preferred embodiment, the temperature is in range of 50° ° C., to 550° C., or in range of 60° ° C., to 550° ° C., or in range of 70° ° C., to 550° C., or in range of 80° C., to 550° C. In a more preferred embodiment, the temperature is in range of 90° ° C., to 500° C., or in range of 100° C., to 500° ° C., or in range of 110° ° C., to 500° C., or in range of 110° ° C., to 490° C.

In an embodiment, the heating means heats the composite material base unit (201) before pressing by the impression module.

In another embodiment, the heating means heats the composite material base unit (201) during pressing by the impression module (103). Preferably, the heating means is configured to heat the impression module (103) such that the surface (202) of the composite material base unit (201) is cured while forming the at least one surface geometry (203) on the surface (202).

In a more preferred embodiment, the heating means heats the impression module (103) at a temperature of in range of 100° ° C., to 500° ° C., or in range of 110° ° C., to 500° C., or in range of 150° ° C., to 500° C., or in range of 200° ° C., to 500° C.

In another embodiment, the heating means heats the composite material base unit (201) after pressing by the impression module.

In yet another embodiment, the heating means heats the composite material base unit (201) both before and after pressing by the impression module.

In yet another embodiment, the heating means heats the composite material base unit (201) before, during and after pressing by the impression module.

In yet another embodiment, the heating means heats the composite material base unit (201) both before and during pressing by the impression module.

In yet another embodiment, the heating means heats the composite material base unit (201) both during and after pressing by the impression module.

In a preferred embodiment, the modifying unit (100) comprises at least one wheel (101) with a tread (102) defined by the at least one impression module (103). The impression module (103) includes at least one protrusion, and/or at least one depression. The at least one wheel (101) is configured to rotate and press the at least one protrusion (103) on the surface (202) on the composite material base unit (201).

In a more preferred embodiment, the modifying unit (100) comprises a pair of wheels (101*a*. 101*b*) as illustrated in FIG. 1. The wheel (101*a*) is configured to rotate in clockwise direction, while the wheel (101*b*) rotates in anticlockwise direction. In the most preferred embodiment, each wheel (101*a*, 101*b*) has the tread (102) with the impression module (103) defined by a set of protrusions (103*a*). The wheels (101*a*, 101*b*) are configured to rotate and press the protrusions (103*a*) on the surface (202) on the compression limiter (201*a*). The compression limiter (201*a*) is passed through a cavity defined by the treads (102) of the wheels (101*a*. 101*b*). While the compression limiter (201*a*) passes through the cavity defined by the treads (102) of the wheels (101*a*. 101*b*), the surface (202) is modified with the surface geometries (203). The protrusions (103*a*) are configured to be complementary to the surface geometry (203). In a most preferred embodiment, the modifying unit (100) is a pultrusion unit.

Figure 2:
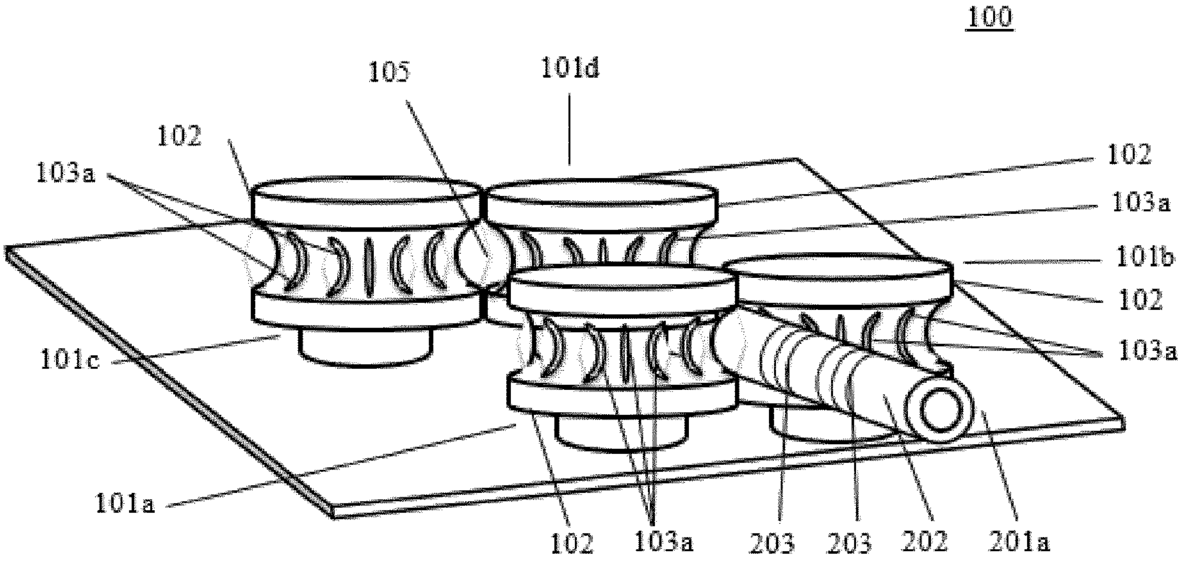
FIG. 2 illustrates an embodiment with the modifying unit (100) comprising the two pairs of wheels (101*a*,101*b*) and (101*c*, 101*d*).

In another more preferred embodiment, the modifying unit (100) comprises two pair of wheels (101*a*, 101*b*) and (101*c*. 101*d*) as illustrated in FIG. 2. The wheels (101*a*, 101*b*, 101*c*. 101*d*) are configured to rotate and press the protrusions (103*a*) on the surface (202) on the compression limiter (201*a*). In a most preferred embodiment, the wheel (101*a*. 101*c*) are configured to rotate in clockwise direction, while the wheel (101*b*, 101*c*) rotate in anticlockwise direction. The compression limiter (201*a*) is passed through the cavity (105) defined by the treads (102) of the wheels (101*a*. 101*b*) and the cavity (105) defined by the treads (102) wheels (101*c* and 101*d*).

In a more preferred embodiment, the modifying unit (100) comprises two pair of wheels (101*a*, 101*b*) and (101*c*. 101*d*) are arranged sequentially to each other as shown in FIG. 2.

Figure 6:
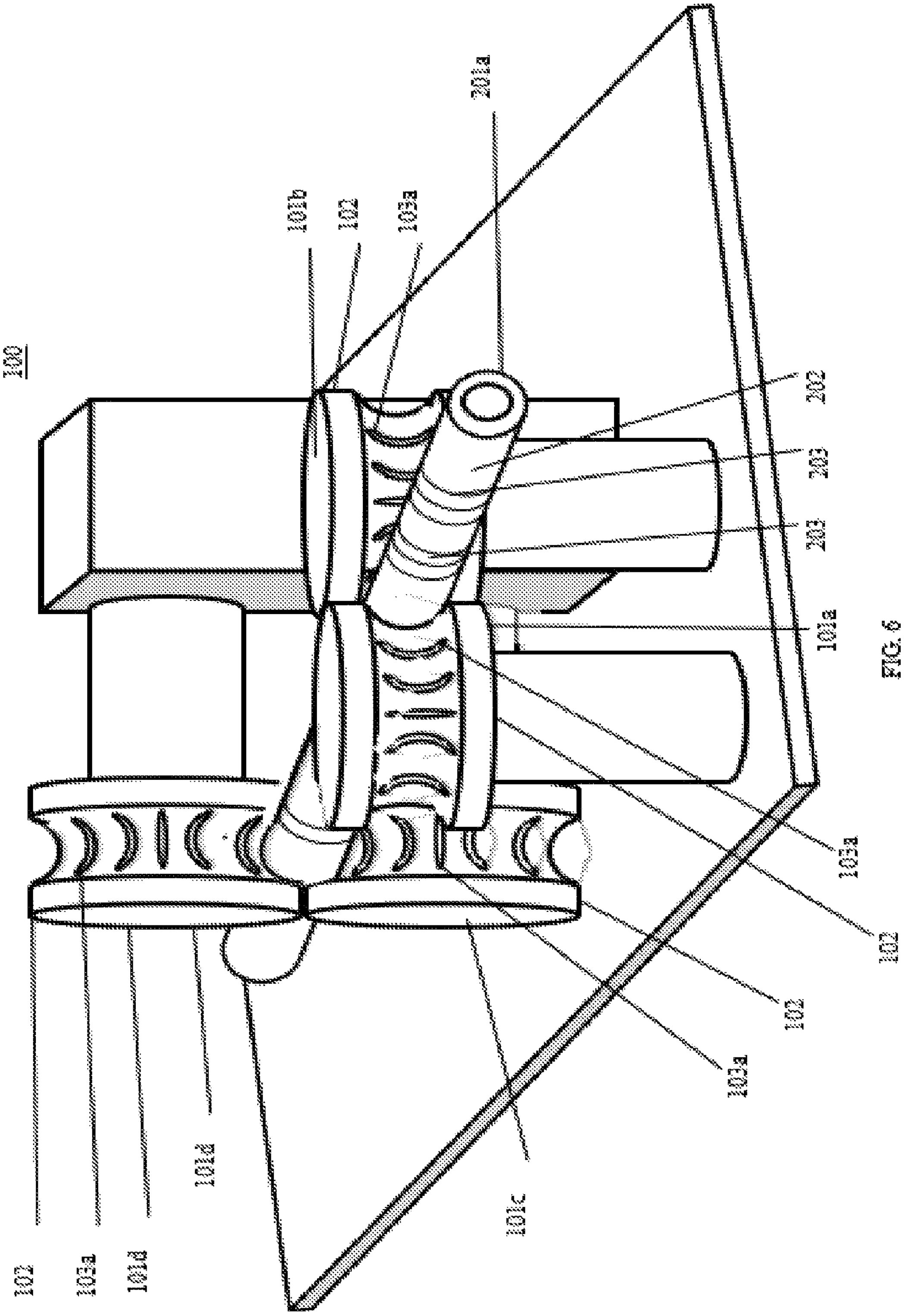
FIG. 6 illustrates another embodiment with the modifying unit (100) comprising the two pairs of wheels (101*a*,101*b*) and (101*c*. 101*d*) that are arranged at an angle to each other.

In an alternate more preferred embodiment, the modifying unit (100) comprises two pair of wheels (101*a*. 101*b*) and (101*c*. 101*d*) arranged at an angle to each other as shown in FIG. 6. In a more preferred embodiment, the pair of wheels are arranged perpendicular to each other.

Figure 5:
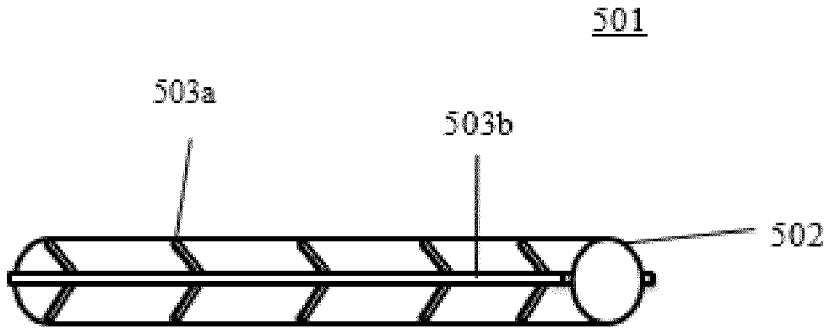
FIG. 5 shows illustrates modified reinforcement bar (501).

In another more preferred embodiment, the modifying unit (100) comprises a pair of wheels. Each wheel has the tread (102) with the impression module (103) defined by a set of depressions. The impression module (103) when pressed on a composite material base unit (201) in form of unmodified reinforced bar; the surface (202) is modified with the surface geometry (203) in form of knobs (503*a*), and or ribs (503*b*). The reinforced bar (501) with the surface (502) modified with the knobs (503*a*) and the ribs (503*b*) is illustrated in FIG. 5.

In another preferred embodiment, the modifying unit (100) comprises at least one die defined by the impression module (103). The impression module (103) includes at least one protrusion, and/or at least one depression. The die is configured to be pressed on the surface (202) of the composite material base unit (201). The composite material base unit (201) includes shape of a flat sheet, a cube, a compression limiter, a reinforced rebar.

In a more preferred embodiment, the modifying unit (100) as a die has the impression module (103) defined by protrusions.

Another aspect of the present invention is directed towards a process for interlocking the surface (202) of composite material base unit (201), the process comprising:

a. modifying the surface (202) of the composite material base unit (201) by the process of embodiment 1 forming at least one surface geometry (203) on the surface (202);
b. overmolding the surface (202) with at least one surface geometry (203) of the composite material base unit (201) with an injection molded material (301) and
c. optionally curing the injection molded material to form the interlocked based unit (401);

wherein the surface geometry (203) of the composite material base unit (201) mechanically interlocks the composite material base unit (201) with the injection molded material.

Overmolding is defined as a process where a single part is created using two or more different materials in combination. Generally, the first material, is partially or fully covered by subsequent materials (overmold materials) during the manufacturing process. In the present invention, the composite material base unit (202) is covered partially or completely by the injection molded material.

Figure 4:
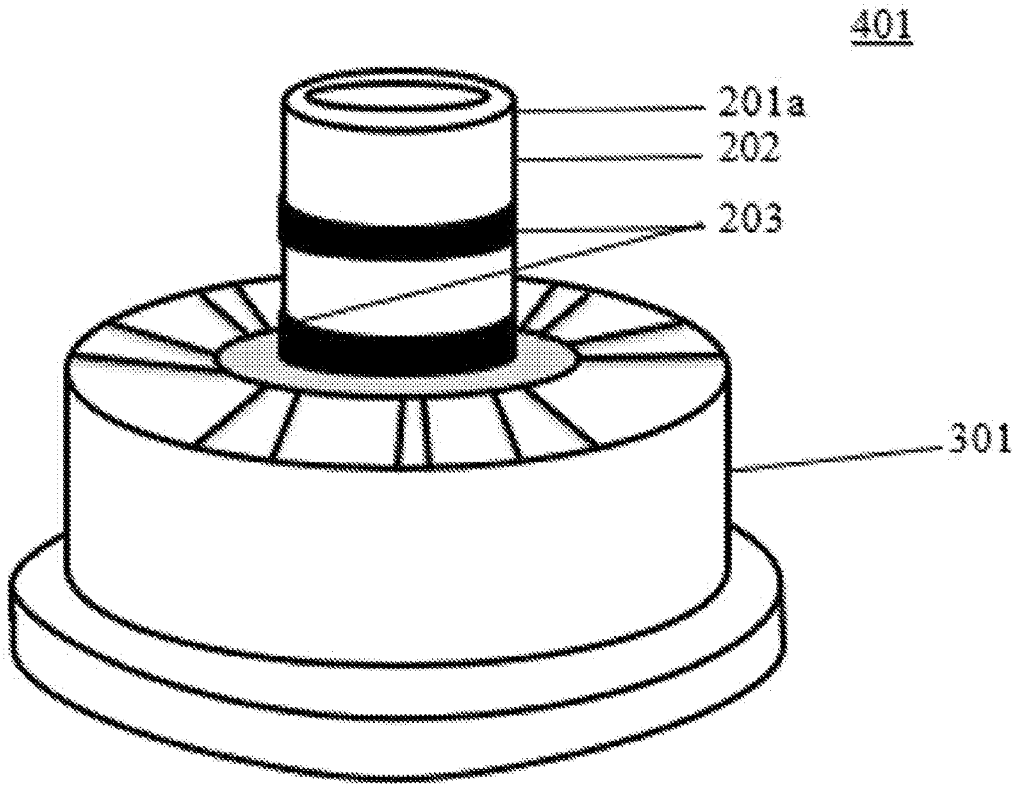
FIG. 4 shows exploded view of the composite material base unit (201) with surface geometry (203) on the surface (202) being interlocked with the injection molded material (301).

FIG. 4, illustrates partially exploded view of the interlocked composite material base unit (401) formed by overmolding the surface (202) with the surface geometries (203) with an injection molded material (301).

Injection Molded Material

The injection molded material (301) includes thermoplastic composite, a polyamide, a co-polyamide, an aromatic polyamides, a thermoplastic polyurethane (TPU), or any combination thereof.

In an embodiment, the injection molded material (301) is a thermoplastic composite material. The thermoplastic composite material comprises a plurality of reinforcing fiber bonded together with a thermoplastic material. That is, to say, that the plurality of reinforcing fibers is impregnated on the surface of the thermoplastic material and strongly bond therewith. This results in the overall composite achieving properties better than the material itself. The choice of such reinforcing fiber is based on the physical characteristics desired in the component. However, preferably it comprises one or more of metal fiber, metalized inorganic fiber, metalized synthetic fiber, glass fiber, polyester fiber, polyamide fiber, graphite fiber, carbon fiber, ceramic fiber, mineral fiber, basalt fiber, inorganic fiber, aramid fiber, kenaf fiber, jute fiber, flax fiber, hemp fiber, cellulosic fiber, sisal fiber and coir fiber. In other embodiment, the reinforcing fiber comprises one or more of metal fiber, metalized inorganic fiber, metalized synthetic fiber, glass fiber, polyester fiber, polyamide fiber, graphite fiber, carbon fiber, ceramic fiber, mineral fiber, basalt fiber and inorganic fiber. In another embodiment, the reinforcing fiber comprises one or more of glass fiber, polyester fiber, polyamide fiber, graphite fiber, carbon fiber, ceramic fiber and mineral fiber.

The said thermoplastic material of the at least one thermoplastic composite material comprises one or more of polyolefins, polyamides, polystyrene, acrylonitrylstyrene, butadiene, polyesters, polybutyleneterachlorate, polyvinyl chloride, polyphenylene ether, polyphenylene oxide, polyether imide, polycarbonates, polyester carbonates, acrylonitrilebutylacrylatestyrene polymers, polybutylene terephthalate and polyethylene terephthalate. Some of the many advantages provided by the thermoplastic material is light weight characteristic, improved mechanical properties such as stiffness, strength and durability, and improved thermal properties.

Preferably, the thermoplastic material comprises one or more of polyolefins, polyamides, polystyrene, acrylonitrylstyrene, butadiene, polyesters, polybutyleneterachlorate, polyvinyl chloride, polyphenylene ether, polyphenylene oxide, polyether imide, polycarbonates, polyester carbonates and acrylonitrile-butyl acrylate-styrene polymers. In other embodiment, it comprises one or more of polyolefins, polyamides, polystyrene, acrylonitrylstyrene, butadiene, polyesters, polybutyleneterachlorate, polyvinyl chloride and polyphenylene ether. In another embodiment, it comprises one or more of polyolefins, polyamides, polystyrene, acrylonitrylstyrene, butadiene and polyesters. In yet another embodiment, the thermoplastic material is a polyamide comprising of nylon-6, nylon-6.6 or mixture thereof. These materials may be obtained commercially such as, but not limited to. Ultramid® from BASF.

Preferably, the injection molded material (301) includes polyamides, co-polyamides and aromatic polyamides.

The polyamide include polyamides obtained by polycondensation of at least one aliphatic dicarboxylic acid with one aliphatic or cyclic or cycloaliphatic or arylaliphatic diamine, such as PA 6.6. PA 6.10, PA 6.12, PA 10.10, PA 10.6, PA 12.12, PA 4.6. MXD 6 or PA 9.2, or between at least one aromatic dicarboxylic acid and one aliphatic or aromatic diamine, such as polyterephthalamides or polyisophthalamides, or their blends and (co)polyamides, such as PA 6.6/6.T, PA 9/T, PA 6.6/4.T, PA 10/T, PA 6.T/6.I. PA 6.6/6.1, and the like. In a preferred embodiment, the polyamides is obtained by polycondensation of at least one amino acid or lactam with itself, it being possible for the amino acid to be generated by the hydrolytic opening of a lactam ring, such as, for example, PA 6, PA 7, PA 11, PA 12. PA 13 or their blends and (co)polyamides.

Polyamides are among those polymers with high production volumes worldwide and are mainly used in fibers, engineering materials and films but also for a multiplicity of other purposes. Nylon-6 is the most commonly produced polyamide, its share amounting to about 57%. Hydrolytic polymerization of ε-caprolactam is the classic way to produce nylon-6 (polycaprolactam) and is industrially still very significant. Conventional hydrolytic processes are described for example in Ullmann's Encyclopedia of Industrial Chemistry. Online Edition Mar. 15, 2003, Vol. 28, pp. 552-553 and Kunststoffhandbuch, ¾ Engineering Thermoplastics: Polyamides, Carl Hanser Verlag, 1998, Munich, pp. 42-47 and 65-70. In the first step of the hydrolytic polymerization process, some of the lactam used reacts with water by ring opening to form the corresponding ω-aminocarboxylic acid. The latter then reacts with further lactam in polyaddition and polycondensation reactions to form the corresponding polyamide. In a preferred version. ε-caprolactam reacts with water by ring opening to form aminocaproic acid and, which then goes on to form nylon-6.

In principle, ionic polymerization, in particular anionic polymerizations, may also be carried out. It is also known in principle to produce polyamides by activated anionic lactam polymerization. Lactams, for example caprolactam, lauryllactam, piperidone, pyrrolidone, etc., are ring-openingly polymerized in a base-catalyzed anionic polymerization reaction. This is generally accomplished by polymerizing a lactam melt comprising an alkaline catalyst and a so-called activator (or else co-catalyst or initiator) at elevated temperatures. The activated anionic lactam polymerization process is described with reference to ε-caprolactam in Polyamides. Kunststoff Handbuch. Vol. 3/4, ISBN 3-446-16486-3, 1998, Carl Hanser Verlag, pp. 49-52 and in Macromolecules, Vol. 32, No. 23 (1999), pp. 7726.

An alternative way to produce polyamides involves the polycondensation of aminonitriles. This includes, for example, the production of nylon-6 from 6-aminocapronitrile (ACN). In a conventional procedure, this method comprises a nitrile hydrolysis and subsequent amine-amidation. It is generally carried out in separate reaction steps in the presence of a heterogeneous catalyst, such as TiO2. A multistage procedure has been found to be useful in practice, since the two reaction steps have different requirements regarding water content and completeness of reaction. It is also frequently advantageous with this route to subject the polymer obtained to a purifying operation to remove monomers/oligomers.

In an embodiment, the polyamide is prepared with the lactams are more particularly selected from ε-caprolactam, 2-piperidone (δ-valero lactam), 2-pyrrolidone (γ-butyro lactam), capryl lactam, enantho lactam, lauryllactam, their mixtures and oligomers thereof.

In an embodiment the polyamide produced is homopolyamide. Homopolyamides are derived from one lactam or one aminocarboxylic acid and can be described by means of a single repeat unit. Nylon-6 foundation stones can be constructed for example from caprolactam, aminocapronitrile, aminocaproic acid or mixtures thereof. Preferred homopolyamides are nylon-6 (PA 6, polycaprolactam), nylon-7 (PA 7, polyenantholactam or polyheptanamide), nylon-10 (PA 10, polydecanamide), nylon-11 (PA 11, polyundecanolactam) and nylon-12 (PA 12, polydodecanolactam).

Preferably, the polyamide used is PA6.

The polyamide exhibits a viscosity index, measured according to the standard ISO307. Generally the viscosity index is in range of 50 to 200 ml/g or in the range of 60 to 180 ml/g, or in range of 80 to 160 ml/g, or in range of 95 to 125 ml/g.

In another preferred embodiment, the copolyamides are used. Copolyamides are derived from two or more different monomers, the monomers being linked to each other by an amide bond in each case. Possible copolyamide building blocks can derive for example from lactams, aminocarboxylic acids, dicarboxylic acids, and diamines. Preferred copolyamides are polyamides of hexamethylenediamine and adipic acid (PA 66) and also polyamides of caprolactam, hexamethylenediamine and adipic acid (PA 6/66). Copolyamides may comprise the incorporated polyamide building blocks in various ratios.

To produce copolyamides, generally, a monomer mixture which in addition to at least one lactam or aminocarbonitrile and/or oligomer thereof is used. Suitable monomers are dicarboxylic acids, for example aliphatic C4-10 alpha, omega-dicarboxylic acids, such as succinic acid, glutaric acid, adipic acid, pimelic acid, suberic acid, azelaic acid, sebacic acid and dodecanedioic acid. Aromatic C8-20 dicarboxylic acids, such as terephthalic acid and isophthalic acid, can also be used.

Diamines useful as monomers include α,ω-diamines having four to ten carbon atoms, such as tetramethylenediamine, pentamethylenediamine, hexamethylenediamine, heptamethylenediamine, octamethylenediamine, nonamethylenediamine and decamethylenediamine. The salt of adipic acid and hexamethylenediamine, known as 66 salt, is also used among those salts of the dicarboxylic acids and diamines which are useful as monomers.

In a preferred embodiment Hexamethylenediamine is used. Especially the salt of adipic acid and hexamethylenediamine, known as 66 salt, is preferred among those salts of the recited dicarboxylic acids and diamines which are useful as monomers.

In a more preferred embodiment, the polyamide is reinforced with glass fibres. The glass fibres include short glass fibres.

Polyamides are obtainable using one or more chain transfer agents, for example aliphatic amines or diamines, such as triacetonediamine or a mono- or dicarboxylic acid, such as propionic acid and acetic acid, or aromatic carboxylic acids, such as benzoic acid or terephthalic acid.

The catalyst is selected from sodium caprolactamate, potassium caprolactamate, bromide magnesium caprolactamate, chloride magnesium caprolactamate, magnesium biscaprolactamate, sodium hydride, sodium, sodium hydroxide, sodium methoxide, sodium ethoxide, sodium propoxide, sodium butoxide, potassium hydride, potassium, potassium hydroxide, potassium methoxide, potassium ethoxide, potassium propoxide, potassium butoxide and mixtures thereof.

In an embodiment, the catalyst is selected from sodium hydride, and sodium caprolactamate. Sodium caprolactamate in particular is employed as catalyst. In a specific embodiment, a solution of sodium caprolactamate in caprolactam is employed. A mixture of this type is commercially available under the name Brüggolen® C10 from Brüggemann Chemical. L. Brüggemann Kommanditgesellschaft. Germany and comprises 17 to 19 wt. % of sodium caprolactamate in caprolactam. A likewise suitable catalyst is, in particular, bromide magnesium caprolactamate, e.g., Brüggolen® C1 from BrüggemannChemical. Germany.

The molar ratio of lactam to catalyst can be varied within wide limits, generally it is in the range from 1:1 to 10 000:1, preferably in the range from 5:1 to 1000:1 and more preferably in the range from 1:1 to 500:1.

The activators for the anionic polymerization process are lactams N-substituted by electrophilic moieties, an example being an acyllactam. Useful activators further include precursors to such activated N-substituted lactams, which combine with the lactam to form an activated lactam in situ. The number of growing chains depends on the activator quantity. Useful activators include in general isocyanates, acid anhydrides and acyl halides and/or reaction products thereof with the lactam monomer.

In an embodiment, the activators include aliphatic, cycloaliphatic, araliphatic and aromatic diisocyanates. Useful aliphatic diisocyanates include, for example, tetramethylene diisocyanate, hexamethylene diisocyanate, octamethylene diisocyanate, decamethylene diisocyanate, undecamethylene diisocyanate and dodecamethylene diisocyanate. Useful aliphatic diisocyanates include, for example, 4,4'-methylenebis-(cyclohexyl) diisocyanate, isophorone diisocyanate and 1,4-diisocyanatocyclohexane. Useful aromatic diisocyanates include, for example, tolyl diisocyanate, 4,4'-diphenyl-methane diisocyanate, xylylene diisocyanate and tetramethylxylylene diisocyanate.

In an embodiment, further use is done of polyisocyanates obtainable from the abovementioned diisocyanates, or mixtures thereof, by linking via urethane, allophanate, urea, biuret, uretdione, amide, isocyanurate, carbodiimide, uretoneimine, oxadiazinetrione or iminooxadiazinedione structures. These include, for example, the isocyanurate of hexamethylene diisocyanate. This is commercially available under the name Basonat HI 100 from BASF SE. Germany.

The activators further include aliphatic diacyl halides, butylenediacyl chloride, butylenediacyl bromide, hexamethylenediacyl chloride, hexamethylenediacyl bromide, octamethylenediacyl chloride, octamethylenediacyl bromide, decamethylenediacyl chloride, decamethylenediacyl bromide, dodecamethylenediacyl chloride, dodecamethylenediacyl bromide, 4,4'-methylenebis(cyclohexanecarbonyl chloride), 4,4'-methylenebis(cyclohexanecarbonyl bromide), isophoronediacyl chloride, isophoronediacyl bromide; and also aromatic diacyl halides, such as tolylmethylenediacyl chloride, tolylmethylenediacyl bromide, 4,4'-methylenebis-(phenylcarbonyl chloride), 4,4'-methylenebis (phenylcarbonyl bromide). Mixtures of the recited compounds can also be employed as activators.

The molar ratio of lactam to activator can be varied within wide limits and is generally in the range from 1:1 to 10 000:1, preferably in the range from 5:1 to 2000:1 and more preferably in the range from 20:1 to 1000:1.

In a preferred embodiment the composite material base unit (201) and injection molded material (301) are made of different or dissimilar compositions.

In an embodiment, the curing time for the injection molded material (301) is in the range of 0 mins to 24 hrs.

In an embodiment, the injection molded material is dried at a temperature in the range of 50 to 200° C., or in the range of 80 to 150° C., or in the range of 100 to 120° C.

In an embodiment, the interlock formed by the at least one surface geometry (203) with the injection molded material is associated with a pull out force in the range of 1000.N to 50,000.0 N. In a preferred embodiment, the pull-out force is in the range of 5000.0 N to 50,000.0 N, or in the range of 10,000.0 N to 50,000.0 N. In a more preferred embodiment, the pull-out force is in the range of 10,000.0 N to 45,000.0 N, or in the range of 10,000.0 N to 40,000.0 N, or in the range of 10,000.0 N to 38,000.0 N.

In an embodiment, the composite material base unit (201) includes at least one surface geometry (203) with a height to width ratio in range from 1:100 to 100:1. In a preferred embodiment, the height to width ratio is in range from 1:90 to 90:1, or from 1:80 to 80:1, or from 1:70 to 70:1, or from 1:60 to 60:1, or from 1:50 to 50:1 or from 1:40 to 40:1, or from 1:30 to 30:1, or from 1:20 to 20:1, or from 1:10 to 10:1. In a more preferred embodiment, the height to width ratio is in range from 1:9 to 9:1, or from 1:8 to 8:1, or from 1:7 to 7:1, or from 1:6 to 6:1, or from 1:5 to 5:1, or from 1:4 to 4:1.

In the most preferred embodiment, the surface geometry (103) is formed by the impression module (103) includes circular protrusions (103*a*) such that the ratio of height to width is 1:1. In another most preferred embodiment, the surface geometry (103) has a height of 0.635 cm and width of 0.4765 cm, such that the height to width ratio is of 1.33:1. In yet another most preferred embodiment, the surface geometry (103) has a height of 0.4765 cm and width of 0.635 cm, such that the height to width ratio is 1:1.33.

In an embodiment, the composite material base unit (201) includes at least one surface geometry (203) such that the ratio of area of the surface (202) modified to obtain the at least one surface geometry (203) is 0.001% to 75.0% of the total area of the surface (202). In a preferred embodiment, the ratio of area of the surface (202) modified to obtain the at least one surface geometry (203) is from 5% to 75.0%, or 10% to 75%, or from 15% to 75%, or from 20% to 75% or from 25% to 75% of the total area of the surface (202).

In an embodiment, the composite material base unit (201) includes at least one surface geometry (203) configured to form interlock with the injection molded material (301), such that the interlock is associated with a pull out force in range of 1000.0 N to 50,000.0 N. In a preferred embodiment, the pull-out force is in the range of 5000.0 N to 50,000.0 N, or in the range of 10,000.0 N to 50,000.0 N. In a more preferred embodiment, the pull-out force is in the range of 10,000.0 N to 45,000.0 N, or in the range of 10,000.0 N to 40,000.0 N, or in the range of 10,000.0 N to 38,000.0 N.

In an embodiment, the composite material base unit (201) includes at least one surface geometry (203) defined as at least one surface geometry (203) is defined as deep screw thread, shallow screw thread, concentric ring, dovetail, groove, concentric groove.

Yet another aspect of the present invention is directed towards use of the composite material base unit (201) as described hereinabove or as obtained by the process as described hereinabove as an article of construction, vehicle spare parts, not limited to compression limiters and reinforcement bar.

The composite material base unit (201) in form of the compression limiter (201*a*) of the invention is associated with significant increase in the pull out force in an order of 1200% to 4200% compared to pull out force required for an unmodified compression limiter (201) when interlocked with an injection molded material (301).

The interlocked composite material base unit (401) is also associated with improved torsional resistance, improved performance in creep testing as well as thermal testing. Usage of interlocked composite material base unit (401) based on modification of the compression limiter (201*a*) as well as the reinforcement bar (501) are associated with a mass savings till 75% and cost saving till 80% when replacing corresponding metal components interlocked in automotive parts and construction parts. Usage of interlocked composite material base unit (401) based on modification of the compression limiter (201*a*) and the reinforcement bar (501) thus provide light weight and improved alternative to heavier metal parts and also have improved fastener retention and pullout strength.

The level of force required to push the compression limiter (201*a*) out of the interlock is measured by METHOD A.

Method A

The compression limiter (201*a*) is overmolded with the injection molded material (301) having a geometry suitable for testing referred to as test puck type geometry as illustrated in the FIG. 4 to form the interlocked composite material base unit (401) also referred to as the test puck. The test puck/the interlocked composite material base unit (401) is placed in a test fixture. The test puck/the interlocked composite material base unit (401) is subjected to an Intron type force deflection hydraulic press. The level of force required to push the compression limiter (201*a*) fully out of the injection molded material (301) is recorded.

The presently claimed invention is illustrated in more detail by the following embodiments and combinations of embodiments which results from the corresponding dependency references and links:

I. A process of modifying a surface (202) of a composite material base unit (201), the process comprising:

a. providing the composite material base unit (201);
b. pressing at least one impression module (103) of a modifying unit (100) on the surface (202) of the composite material base unit (201) to form at least one surface geometry (203) on the surface (202);
c. optionally heating the composite material base unit (201) to cure the surface (202) by a heating means before pressing, during pressing, after pressing, or combinations thereof;

wherein the composite material base unit comprises a resilient material, a covering material, or a combination thereof. wherein the impression module (103) includes at least one protrusion, and/or at least one depression resulting in said surface geometry (203) on said surface (202).

II. The process of embodiment I, wherein the composite material base unit (201) is a compression limiter or a composite rebar, where the composite material base unit (201) comprises a thermoplastic composite, a polyamide, a co-polyamide, an aromatic polyamides, a thermoplastic polyurethane (TPU), or any combination thereof.

III. The process of embodiment I or II, wherein the pressure exerted by the at least impression module (103) of the modifying unit (101) on surface of the composite material base unit (201) is range of 0.1 Pa to 100 G Pa.

IV. The process of embodiment I to III, wherein the surface (202) of the composite material base unit (201) is pressed by the at least one impression module (103) of the modifying unit (100) for a period of 1 second to 24 hrs.

V. The process of any one of embodiments I to IV, wherein the heating means provides a temperature of 30° ° C., to 600° C.

VI. The process of any one of embodiments I to V, wherein the modifying unit (100) comprises at least one wheel (101) with a tread (104) defined by the at least one impression module (103).

wherein the at least one wheel (101) is configured to rotate and press the impression module (103) on the surface (202) of the composite material base unit (201).

VII. The process of any one of embodiments I to V, wherein the modifying unit (100) comprises at least one die.

VIII. A process for interlocking the surface (202) of composite material base unit (201), the process comprising:

a. modifying the surface (202) of the composite material base unit (201) by the process of any of embodiments I to VII, forming at least one surface geometry (203) on the surface (202);
b. overmolding the surface (202) with at least one surface geometry (203) of the composite material base unit (201) with an injection molded material (301) and
c. optionally curing the injection molded material to form the interlocked based unit (401);

wherein the surface geometry (203) of the composite material base unit (201) mechanically interlocks the composite material base unit (201) with the injection molded material.

IX. The process of any one of embodiments I to VIII, wherein the composite material base unit (201) includes the resilient material, without the covering material, or a resilient material partially covered with the covering material or a resilient material completely covered by the covering material, or only the covering material.

X. The process of any one of embodiments VIII or IX, wherein the injection molded material (301) includes thermoplastic composite, polyamides, copolyamides and aromatic polyamides.

XI. The process of any one of embodiments VIII to X, wherein the injection molded material (301) further includes additive comprising glass fibre.

XII. The process of embodiment VIII to X, wherein the curing time for the injection molded material (301) is in range of 0 mins to 24 hrs.

XIII. The process of embodiments VIII to XII, wherein interlock formed by the at least one surface geometry (203) with the injection molded material is associated with a pull-out force is in range of 1000.0 N to 40,000.0 N.

XIV. A composite material base unit (201) as obtained by any one of embodiments I to XIII.

XV. A composite material base unit (201) of embodiment XIV or as obtained by any one of embodiments I to XIII, wherein in the at least one surface geometry (203) has a height to width ratio in range of 1:100 to 100:1.

XVI. A composite material base unit (201) of embodiment XIV or XV or as obtained by any one of embodiments I to XIII, wherein area of the surface (202) modified to obtain the at least one surface geometry (203) is 0.001% to 75.0% of the total area of the surface (202).

XVII. A composite material base unit (201) of embodiments XIV to XVI or as obtained by any one of embodiments I to XIII, wherein in the at least one surface geometry (203) configured to form interlock with the injection molded material, wherein the interlock is associated with a pull-out force in range of 1000.0 N to 50,000.0 N.

XVIII. The composite material base unit (201) of embodiments XIV to XVII or as obtained by any one of embodiments I to XIII, wherein the at least one surface geometry (203) is defined as deep screw thread, shallow screw thread, concentric ring, dovetail, groove, concentric groove.

XIX. The composite material base unit (201) of embodiments XIV to XVIII or as obtained by any one of embodiments I to XIII, wherein the composite material base unit (201) is a compression limiter, a composite rebar, or a TPU (Thermoplastic polyurethane) article.

XX. Use of the composite material base unit (201) of embodiments XIV to XIX or as obtained by any one of embodiments I to XIII as an article of construction, vehicle spare parts, not limited to compression limiters and reinforcement bar.

XXI. The process of embodiments I to XIII, wherein the composite material base unit (201) and the injection molded material (301) are of different/dissimilar compositions.

Examples

The presently claimed invention is illustrated by the non-restrictive examples which are as follows:

| Raw materials | |
|---|---|
| POLYAMIDE | |
| P1 | Ultramid A3WG10 CR ǀ Nylon 66/PA66 (Hexamethylene Diamine/Adipic Acid) + 50% Short Glass Fibres |
| POLYURETHANE | |
| U1 | Elastocast ǀ Modified MDI |
| ADDITIVE | |
| Additive 1 | Short glass fibre |

| Standard method | |
|---|---|
| DIN 53240-1 | OH value |

General Process of Forming the Composite Material Base Unit

Figure 3:
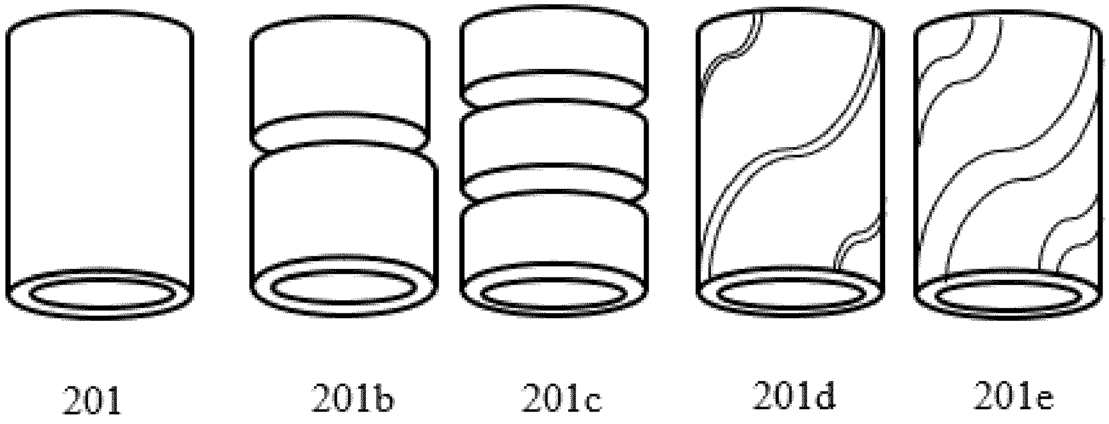
FIG. 3 illustrates an embodiment with unmodified composite material base unit (201) as compression limiter (201) and the modified compression limiters (201*a*), (201*b*), (201*c*), (201*d*), and (201*e*).

The composite material base unit (201) was produced by using the covering material, U1 i.e. Modified MDI molded in shape of the compression limiter (201) as illustrated in FIG. 3.

Process of Modifying the Surface (202) of the Compression Limiter (201):

The compression limiter (201) was provided to the cavity (105) between the wheels (101). The surface (202) was pressed with the circular protrusions (103*a*) on the treads (102) of the wheels (101) in the modifying unit (100). Upon pressing the surface (202) was modified with the surface geometry (203) on the compression limiter (201*a*) as illustrated in FIG. 1.

Similar modification of the surface (202) was performed to obtain the compression limiters with shallow thread (201*d*), deep thread (201*e*), single groove (201*b*), and double groove (201*c*) as illustrated in FIG. 4. Further modification of the surface (202) was performed to obtain the compression limiters with three grooves with 100% circumference (201*f*) (not illustrated in figures).

The compression limiters (201), (201*b*), (201*c*), (201*d*), (201*e*) and (201*f*) were then subjected to the process of forming interlocking the surface (202) by overmolding the surface (202) with the injection molding material (301) to form the interlocked composite material base unit (401) as illustrated in FIG. 4. Injection molded material included P1 with 50 wt. % of Additive 1.

The compression limiter (201) with no surface geometry and the ones with surface geometry were then tested by METHOD A to determine the pull-out deflection force needed. The modified compression limiters (201*b*), (201*c*) (201*d*), (201*e*) and (201*f*) were compared with original unmodified compression limiter (201) for the Instron type deflection force as denoted in Table 1.

TABLE 1

Deflection force required pushing the Compression Limiter with different geometry out of overmolded test puck.

| | Original Straight Wall (Unmodified) (201) | Shallow Thread (201d) | Deep Thread (201e) | Single Groove (201b) | Double Groove (201c) | Three Groove (201f) |
|---|---|---|---|---|---|---|
| Average force for Deflection | 189 lbf \| 840.714 N | 11009.34 N | 20936.66 N | 1827.03 N | 36275.23 N | 41146.5 N |
| Increase vs. Baseline | — | 1121.84% | 2394.70% | 1666.78% | 4222.44% | 4800.66% |

The modified compression limiters (201*b*), (201*c*) (201*d*) and (201*e*) were observed to be associated with a 1100% to 4200% increase in pull out force.

The compression limiters (201) to (201*f*) had height of 2.54 cm and the width of 2.223 cm. The compression limiters (201*b*), (201*c*) (201*d*), (201*e*) and (201*f*) had at least one surface geometry (203) formed by circular protrusion (103*a*) such that the at least one surface geometry (203) has a height of 0.635 cm and width of 0.635 cm. Accordingly, the height to width ratio of the surface geometry (203) was 1:1. At least 2 surface geometries (203), when present, were spaced 1.27 cm away from each other and measured from center of one surface geometry (203) to centre of another surface geometry (203).

The invention claimed is:

1. A process of modifying a surface of a composite material base unit, the process comprising:

a. providing the composite material base unit;

b. pressing at least one impression module of a modifying unit on the surface of the composite material base unit to form at least one surface geometry on the surface;

c. optionally heating the surface of the composite material base unit by heating before pressing, during pressing, after pressing, or combinations thereof;

wherein the composite material base unit comprises a resilient material, a covering material or a combination thereof, wherein the at least one impression module includes at least one protrusion, and/or at least one depression configured to form the surface geometry on the surface, wherein the composite material base unit is a compression limiter or a composite rebar and wherein the composite material base unit comprises a thermoplastic composite.

2. The process of claim 1, wherein the pressure exerted by the at least one impression module of the modifying unit on the surface of the composite material base unit is in a range of 0.1 Pa to 100 G Pa.

3. The process of claim 1, wherein the surface of the composite material base unit is pressed by the at least one impression module of the modifying unit for a period of 1 second to 24 hrs.

4. The process of claim 1, wherein the heating provides a temperature of 30° C. to 600° C.

5. The process of claim 1, wherein the modifying unit comprises at least one wheel with a tread defined by the at least one impression module, wherein the at least one wheel is configured to rotate and press the impression module on the surface of the composite material base unit.

6. The process of claim 1, wherein the modifying unit comprises at least one die.

7. A process for interlocking a surface of composite material base unit, the process comprising:

a. modifying the surface of the composite material base unit by the process of claim 1, thereby forming at least one surface geometry on the surface;

b. overmolding the surface with the at least one surface geometry of the composite material base unit with an injection molded material and c. optionally curing the injection molded material to form an interlocked based unit;

wherein the surface geometry of the composite material base unit mechanically interlocks the composite material base unit with the injection molded material and wherein the composite material base unit is a compression limiter or a composite rebar and wherein the composite material base unit comprises a thermoplastic composite.

8. The process of claim 1, wherein the composite material base unit includes the resilient material, without the covering material, or a resilient material partially covered with the covering material or a resilient material completely covered by the covering material, or only the covering material.

9. The process of claim 7, wherein the injection molded material includes thermoplastic composite, polyamides, co-polyamides, aromatic polyamides, a thermoplastic polyurethane (TPU), or any combination thereof.

10. The process of claim 7, wherein the injection molded material further includes additive comprising glass fibre.

11. The process of claim 7, wherein a curing time for the injection molded material is in a range of 0 mins to 24 hrs.

12. The process of claim 7, wherein interlock formed by the at least one surface geometry with the injection molded material is associated with a pull-out force in a range of 1000.0 N to 40,000.0 N.

13. A process of modifying a surface of a composite material base unit, the process comprising:

a. providing the composite material base unit;

b. pressing at least one impression module of a modifying unit on the surface of the composite material base unit to form at least one surface geometry on the surface;

c. optionally heating the surface of the composite material base unit by heating before pressing, during pressing, after pressing, or combinations thereof;

d. utilizing the modified composite material base unit as an article of construction or vehicle spare part, wherein the article of construction or vehicle spare part is optionally a compression limiter or reinforcement bar, wherein the composite material base unit comprises a resilient material, a covering material or a combination thereof, wherein the at least one impression module includes at least one protrusion, and/or at least one depression configured to form the surface geometry on the surface, wherein the composite material base unit is a compression limiter or a composite rebar and wherein the composite material base unit comprises a thermoplastic composite.

* * * * *